United States Patent
Allexon et al.

(10) Patent No.: US 8,261,902 B2
(45) Date of Patent: Sep. 11, 2012

(54) METHOD AND APPARATUS FOR PROCESSING UNCLAIMED CASH REDEMPTION RECEIPTS IN A SELF-SERVICE CASH REDEMPTION MACHINE

(75) Inventors: Robert A. Allexon, Oswego, IL (US); William M. Paist, Elmhurst, IL (US)

(73) Assignee: Talaris Inc., Watertown, WI (US)

( * ) Notice: Subject to any disclaimer, the term of this patent is extended or adjusted under 35 U.S.C. 154(b) by 272 days.

(21) Appl. No.: 12/632,192

(22) Filed: Dec. 7, 2009

(65) Prior Publication Data

US 2010/0144259 A1 Jun. 10, 2010

Related U.S. Application Data

(60) Provisional application No. 61/120,671, filed on Dec. 8, 2008.

(51) Int. Cl.
*G07F 9/08* (2006.01)
*G07F 19/00* (2006.01)
*G06M 3/06* (2006.01)
*G06Q 40/00* (2012.01)
*G07D 11/00* (2006.01)

(52) U.S. Cl. .......... 194/215; 235/379; 75/14.35; 902/21

(58) Field of Classification Search .................. 194/200, 194/215, 216, 217, 353; 235/31 R, 31 T, 235/375, 379, 383, 91 R, 91 L, 3; 700/90, 700/236, 241, 306; 902/18, 21, 22, 23, 37, 902/40, 41; 705/77, 14.1, 14.11, 14.13, 14.15, 705/14.35, 14.37, 30, 500
See application file for complete search history.

(56) References Cited

U.S. PATENT DOCUMENTS

| 7,054,833 | B1 | 5/2006 | McDonald |
| 7,258,273 | B2 | 8/2007 | Griffin |
| 2002/0156780 | A1 | 10/2002 | Hertz et al. |
| 2005/0071177 | A1 | 3/2005 | Berger |
| 2009/0239459 | A1* | 9/2009 | Watts et al. ............ 453/18 |
| 2011/0307378 | A1* | 12/2011 | Doran et al. ............ 705/41 |

* cited by examiner

*Primary Examiner* — Mark Beauchaine
(74) *Attorney, Agent, or Firm* — Boyle Fredrickson, S.C.

(57) ABSTRACT

A coin exchange machine (10) and method in which a coin counting mechanism (25, 23) receives a plurality of coins from a customer and counts the coins to determine a total, a dispensing mechanism (20) dispenses a receipt (17a) in exchange for the coins, and wherein before accepting coins for totaling and before dispensing the receipt, the machine (10) causes a display of a notice (21, 22) with a request for the customer to indicate acceptance through a user interface; wherein the machine (10) receives the customer's acceptance of the notice (21, 22) through the user interface; and wherein only after the customer's acceptance, the machine (10) then proceeds to receive and count coins deposited by the customer and to dispense the receipt (17a) to the customer for redemption. The machine (10) keeps a record of the transactions for performing a reconciliation routine to identify unredeemed receipts.

14 Claims, 6 Drawing Sheets

| 66 REDEEM | 61 DATE | 62 TIME | 63 TRANSACTION NO. | 64 PAYEE | 65 AMOUNT ($) |
|---|---|---|---|---|---|
| ☑ | 11/1/2008 | 9:31 AM | 000016 | NAME OR REF. NO. | 25.12 |
| ☑ | 11/1/2008 | 11:30 AM | 000017 | | 35.36 |
| ☐ | 11/1/2008 | 2:31 PM | 000018 | | 214.12 |
| ~ | ~ | ~ | ~ | ~ | ~ |
| ☑ | 11/28/2008 | 10:30 AM | 000077 | | 65.26 |
| ☐ | 11/28/2008 | 1:17 PM | 000078 | | 214.12 |
| ☑ | 11/28/2008 | 3:35 PM | 000079 | | 14.49 |

| CLEARED BALANCE | $6,193.59 |
|---|---|
| BALANCE ISSUED | $6,383.84 |
| UNCLAIMED BALANCE | $190.25 |

METHOD AND APPARATUS FOR PROCESSING UNCLAIMED CASH REDEMPTION RECEIPTS IN A SELF-SERVICE CASH REDEMPTION MACHINE

CROSS-REFERENCE TO RELATED APPLICATION

The benefit of priority based on U.S. Prov. Appl. No. 61/120,671, filed Dec. 8, 2008, is claimed herein.

BACKGROUND ART

The present invention relates to consumer-accessible cash redemption machines and methods for handling receipts or vouchers issued by such machines, but not immediately redeemed by customers. Such transactions may be subject to state laws concerning unclaimed property.

In this type of machine, cash is placed in an intake mechanism, such as a hopper, and is directed to collection receptacles while providing the user with merchandise, a voucher, a receipt or a form of credit, on a memory card, for example.

Whenever a financial or retail business holds unclaimed property such as account balances, official checks, money orders, or gift certificates, and the like, it is required by state laws to return the property to the rightful owner if that is possible. With some value-based media, redeemable for cash, the owner is not known. Such is the case with transaction receipts issued by self-service coin equipment. Transaction receipts that are not redeemed (or are "dormant") after a period of time are can be designated as "abandoned" and become the property of the State under laws generally called unclaimed property laws in a process generally referred to as "escheatment." Regulations and time periods vary by state, but all institutions should have a method of identifying these unredeemed receipts and of tracking them for long periods of time when these transactions fall within the parameters defining unclaimed property. Financial or retail businesses that are subject to state laws on unclaimed property have the right to charge reasonable fees to maintain and track the unclaimed property, in this case, the transaction receipt. After time periods specified by state law, called the dormancy period, those unclaimed funds must be turned over to the state, minus any fees assessed, and earmarked for public use. This reversion of unclaimed property is sometimes referred to as "escheatment."

None of the known self-service coin machines in the U.S have hardware or software components to address the need to identify and track those unredeemed receipt transactions, leaving that function to be addressed by the financial or retail businesses. These separate processes are generally both costly and labor-intensive.

Others have addressed the problems of unclaimed property in other contexts; see for example, Griffin, U.S. Pat. No. 7,258,273; McDonald, U.S. Pat. No. 7,054,833; Berger U.S. Pat. Pub. No. 2005/0071177 and Hertz et al., U.S. Pat. Pub. No. 2002/0156780.

SUMMARY OF THE INVENTION

The invention is practiced in a machine comprising a coin counting mechanism that receives a plurality of coins from a customer and counts the coins to determine a total; a dispensing mechanism that dispenses a receipt in exchange for the coins, wherein the receipt is redeemable for cash or other valuable consideration at an authorized location, which in some instances, can be limited to a business where the machine is located. Before totaling coins and before dispensing the receipt, the machine causes a display of a notice with a request for the customer to indicate acceptance of the notice through a user interface; the machine receives the customer's acceptance of the notice through the user interface; and only after receiving the customer's acceptance, the machine then proceeds to total coins deposited by the customer and to dispense the receipt to the customer for redemption.

The invention is practiced in a method of exchanging coins for cash or credit, the method comprising: receiving a plurality of coins of multiple denominations at a coin exchange machine; counting the plurality of coins with the coin exchange machine to determine a total value of the coins; and dispensing a receipt from the coin exchange machine, wherein the receipt is redeemable for cash or other valuable consideration. Before totaling the coins, and before dispensing the receipt, a notice is displayed on a screen with a request for the customer to indicate acceptance of the notice through a user interface. After receiving the customer's acceptance of the notice through the user interface, the machine then proceeds to total coins deposited by the customer and to dispense the receipt to the customer for redemption.

The machine of the present invention is advantageously located in a customer service area of a financial services office or a retail store. It can also be used in other businesses having a use for such a machine.

The present invention also identifies unredeemed transaction receipts as a part of the periodic reconciliation process. A record of cash input transactions is stored for later use in complying with various state laws concerning unclaimed property. This record is compared with a record of redeemed receipts to identify those receipts that have been redeemed and those receipts that remain unredeemed.

Various other features of the invention will be apparent to those of ordinary skill in the art from the detailed description which follows. In the description, reference is made to the accompanying drawings, which form a part hereof, and which illustrate examples of the invention, however, for a definition of scope of the invention, reference is made to the claims which follow the description.

DETAILED DESCRIPTION

Figure 1:
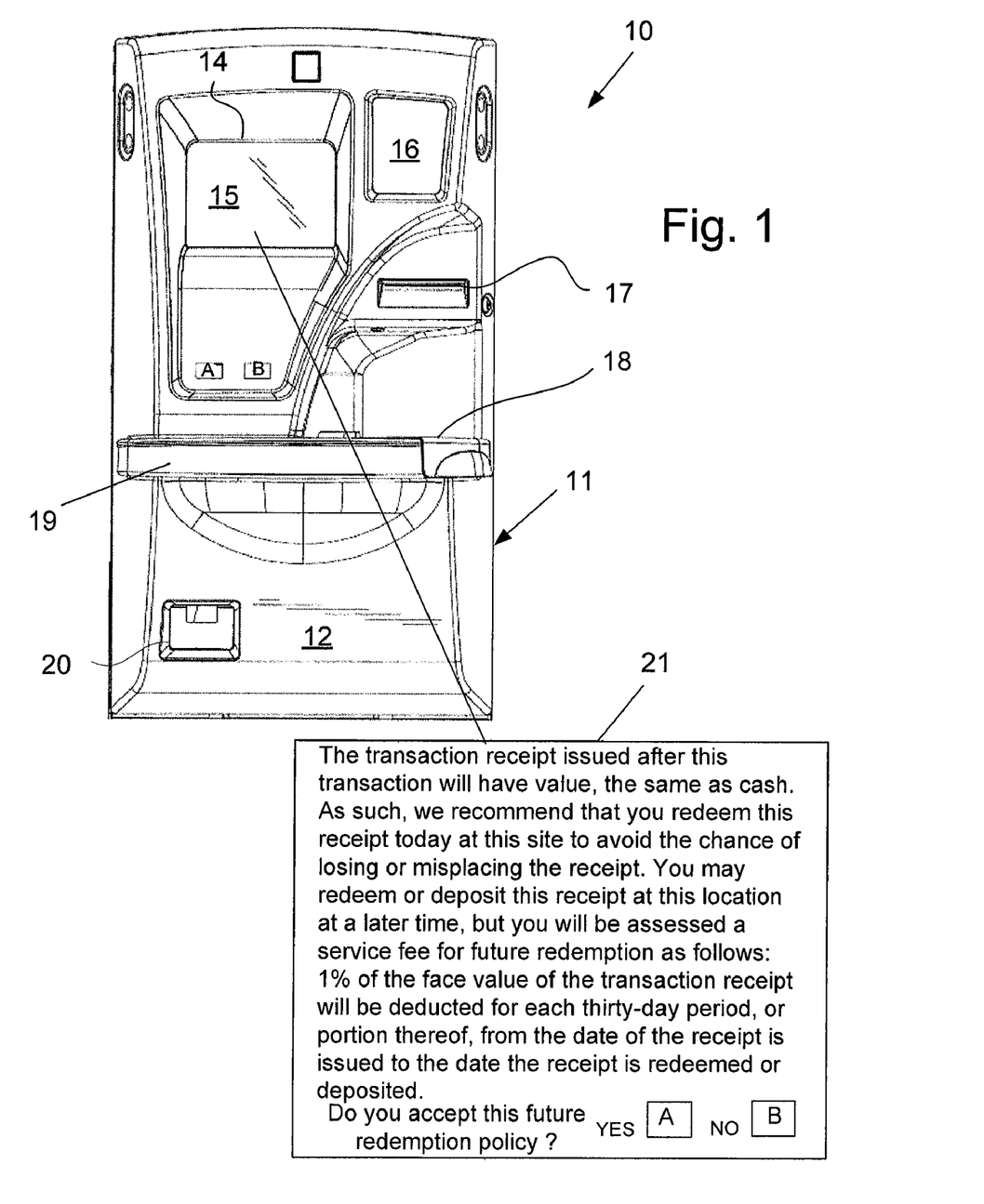
FIG. 1 is frontal fragmentary view of a self-service cash redemption machine with an exploded detail portion.
Figure 2:
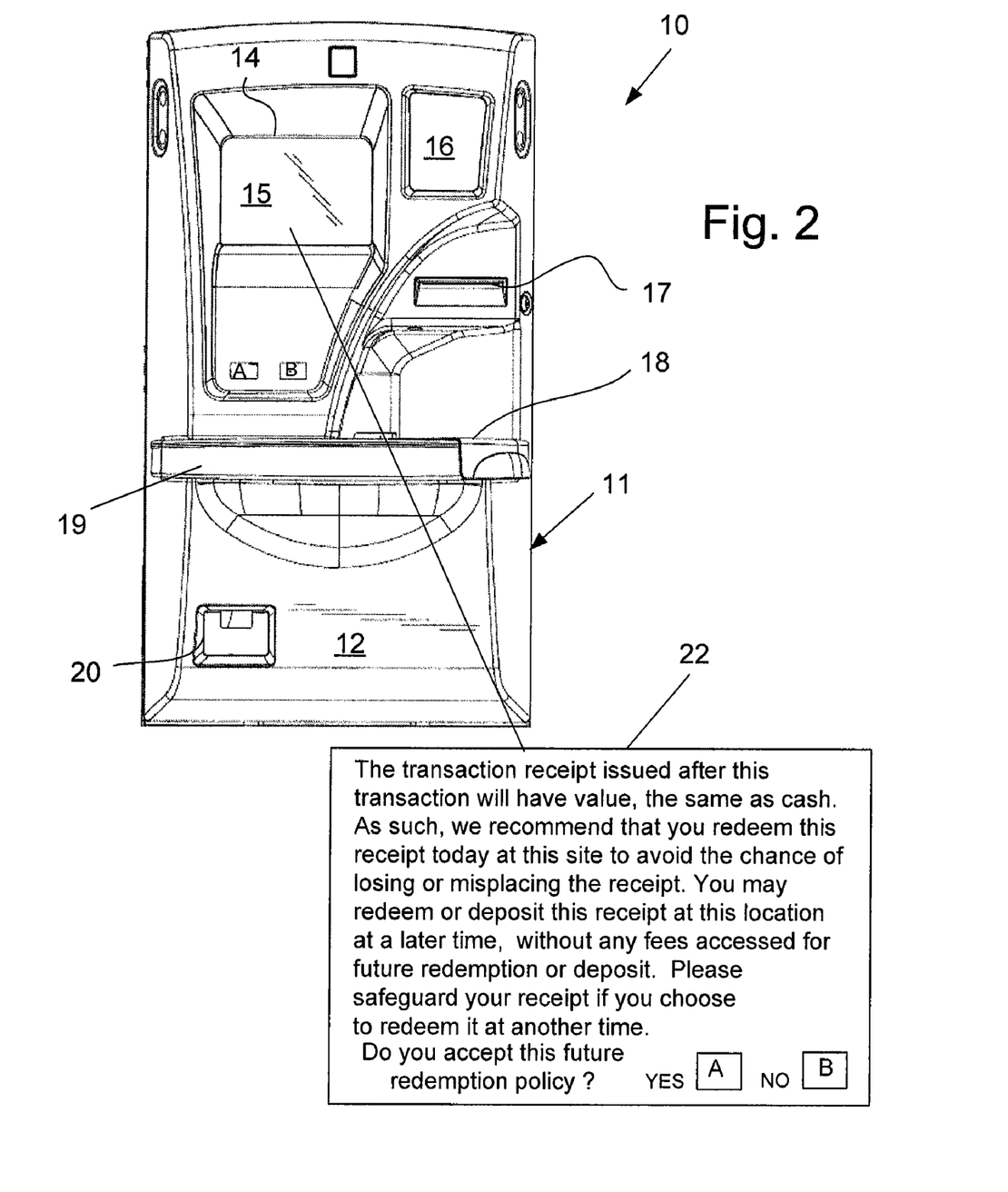
FIG. 2 is view similar to FIG. 1 but with different content in the exploded detail portion.

Referring to FIGS. 1 and 2, the present invention involves a self-service cash collection and cash redemption machine 10, the upper portion of which is illustrated. The machine 10 is housed in a cabinet enclosure 11 having a façade 12. The façade 12 has an opening 14 for viewing a visual display screen 15. Below this screen 15 are two buttons or keys "A" and "B" for allowing the user to enter selections of items displayed on the screen 15. To the right of the display is an area for an advertising display 16 and below that a printout slot 17 for receiving a receipt, voucher or other printable matter that exits a printer 24 installed inside the enclosure 11 and seen in FIG. 6. Just below the printer output slot 17 is a coin intake area 18 with a mechanism for feeding coins into the machine 10. Beneath a customer service shelf 19 is a coin return opening 20.

Figure 6:
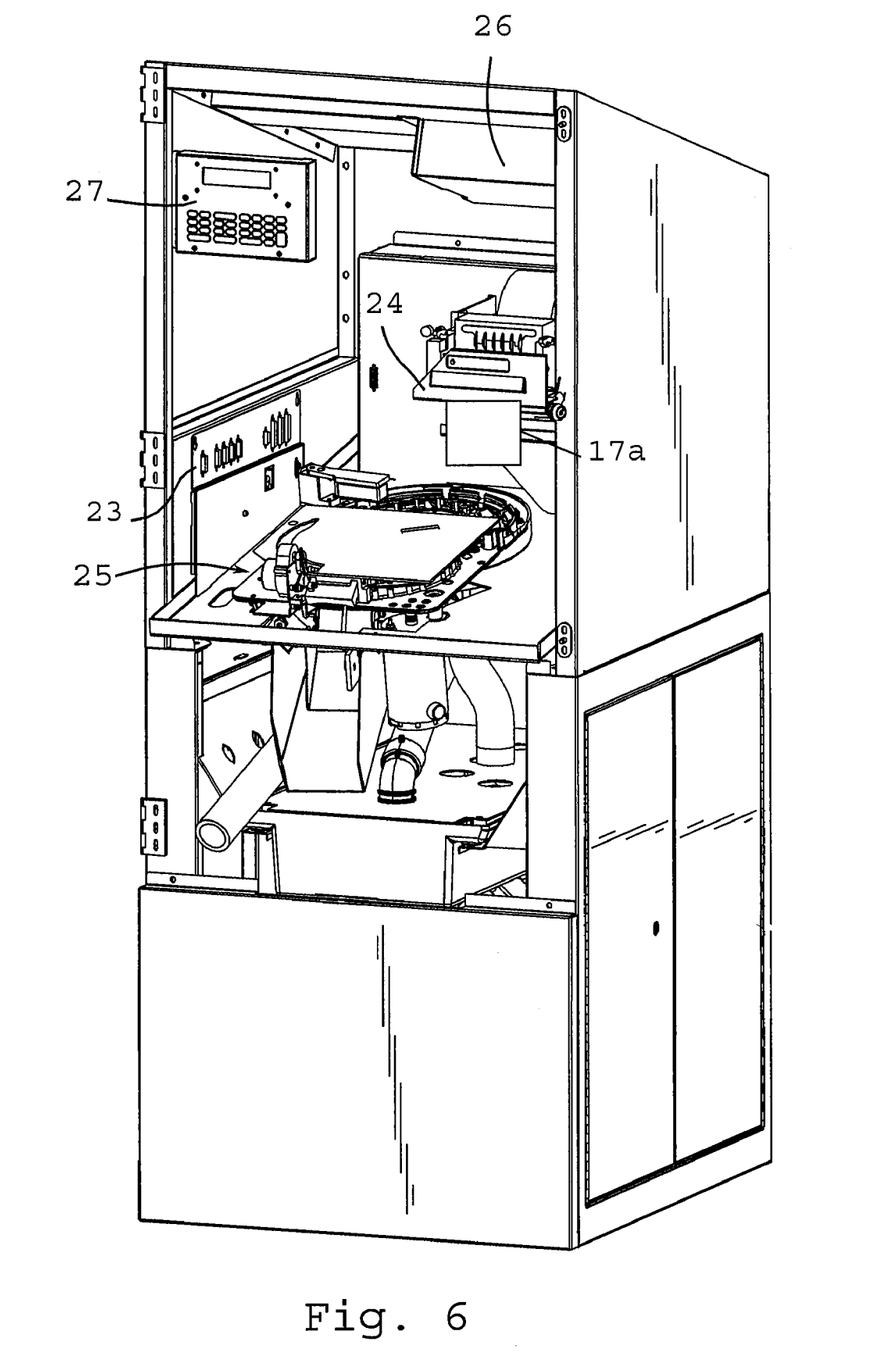
FIG. 6 is a front perspective view of the machine with the façade removed for a better view of the interior components of the machine.

Referring to FIG. 6, the coins are fed into a coin sorter mechanism 25 that receives a plurality of coins from a customer, sorts the coins into respective denominations and counts the coins through exit sensors which signal a controller 23 that determines a total amount received in a batch of coins. The printer 24 dispenses a receipt 17*a* through the slot 17 in FIGS. 1 and 2 in exchange for receiving the coins, but this dispensing is subject to an interactive sequence described below. The receipt 17*a* is redeemable at a cashier location in a business where the machine is located, for cash or other valuable consideration. In the prior art, the amount of cash has usually been for the amount of coins deposited or for that amount less some amount representing a commission.

In order to charge fees during or after the dormancy (unredeemed) period, some state laws provide that the financial or retail business must have a written contractual agreement with the customer. The self-service coin machine is normally in an idle mode, with a "welcome" screen display or prompt, to indicate that the machine is ready to accept coins. Prior to receiving the customer's coins, the machine 10 uses the display screen 15 to provide customers with a notice that transactions not redeemed today will be subject to a service fee charge or additional service charges. The particular display is referred to herein as the "Acceptance Display," and is illustrated as element 21. The Acceptance Display 21 presents the details of that service fee policy for transaction receipts redeemed at some point in the future, as seen in FIG. 1.

The Acceptance Display 21 (FIG. 1) includes a message that reads as follows:

The transaction receipt issued after this transaction will have value, the same as cash. As such, we recommend that you redeem this receipt today at this site to avoid the chance of losing or misplacing the receipt. You may redeem or deposit this receipt at this location at a later time, but you will be assessed a service fee for future redemption as follows: 1% of the face value of the transaction receipt will be deducted for each thirty-day period, or portion thereof, from the date of the receipt is issued to the date the receipt is redeemed or deposited.

Although a specific time and percentage is given in the notice, it should be understood that these parameters, as well as other terms and conditions of the message may be varied to fit different state laws and customer situations without departing from the scope of the invention.

If the customer accepts this offer, the customer signals consent by simply operating the "A" button or key. The offer and acceptance for consideration form a contract under state law. A rejection is signaled by actuating the "B" button or key, and in the event of rejection, the machine is returned to the idle or welcome screen mode. In one embodiment, a hard copy of the fee policy is printed on the front of the transaction receipt 17*a* itself using the printer (FIG. 6) inside printout slot 17 (FIGS. 1 and 2). In another embodiment, the fee policy is pre-printed on the back side of the receipt 17*a* or voucher. In either case, the result of the customer accepting the terms and conditions on the receipt provides a written contract with the customer for that transaction.

In another embodiment of the invention, the financial or retail business may elect not to place any restrictions on the time when the transaction receipt can be redeemed, and may decide not to impose fees for the dormancy (unredeemed) period. Under various state laws, such a policy could make the unredeemed transaction receipts exempt from reporting requirements under the unclaimed property laws. In this embodiment of the invention, an Acceptance Display 22 notifies the customer that the transaction receipt may be redeemed at any time in the future for its face value, without being subject to any fees as more particularly set forth in FIG. 2.

The Acceptance Display 22 in FIG. 2 reads as follows:

The transaction receipt issued after this transaction will have value, the same as cash. As such, we recommend that you redeem this receipt today at this site to avoid the chance of losing or misplacing the receipt. You may redeem or deposit this receipt at this location at a later time, without any fees accessed for future redemption or deposit. Please safeguard your receipt if you choose to redeem it at another time.

It should be understood that the terms and conditions of this message may be varied to fit different state laws and customer situations without departing from the scope of the invention.

Again, in this embodiment of the invention, the customer accepts this policy and notice thereof by operating the "A" button or key or rejects the transaction by operating the "B" button or key. In another embodiment, a hard copy of the future redemption policy is printed on the front of the transaction receipt 17*a* itself using a mechanical printing device behind the printout slot 17. In yet another variation, the future redemption policy is posted in hard copy on the self-service coin machine 10 itself or is pre-printed on a back side of the receipts that are dispensed.

At the conclusion of the transaction, detailed data about the transaction is conveyed by electronic communication to a storage device resident on the self-service machine for subsequent processing.

The machine 10 is operated under the control of a controller 23 and internal personal computer 26 shown in FIG. 6 and further disclosed in U.S. Pat. Pub. 2006/0070483, published Apr. 6, 2006, and in PCT Pub. No. WO 2007/035420, which are cited here for further details of the computerized control of various machine operations. As seen more particularly in a chart of the programmed operation of the machine 10, illustrated in FIG. 3, after the machine 10 is powered up, as represented by start block 30, the welcome screen is displayed on visual display 15 as represented by process block 31. A check is made, as represented by decision block 32, to determine if the state law contract version of the routine is to be followed. This can be controlled by a programming selection or by a machine mode set up option. If the answer is "Yes," as represented by "Yes" result from decision block 32, then the routine displays a contract form of the Acceptance Display 21 as exemplified in FIG. 1, and as represented by I/O block 33. Then the user has the option to accept the terms and conditions of the Acceptance Display 21, by operating the "Yes" button (the "A" button or key in FIG. 2,) as represented by decision block 34. If the user operates the "A" button, as represented by the "Yes" result from decision block 34, the routine proceeds to cause a display of a series of cash processing screens as represented by I/O block 35. If the user declines the terms and conditions, by operating the "B" button, or not operating either button for a timeout period, this is represented by a "No" result from decision block 34, and the routine returns to the welcome screen display. Assuming the user has accepted the terms of the Acceptance Display, and the cash processing screens are being displayed as represented by I/O block 35, the cash is deposited and processed as represented by process block 36. Periodically, a check is made, as represented by decision block 37 to determine whether the user is done depositing cash. When this answer is "Yes," a receipt will be printed with the terms of the fees for delayed redemption as represented by I/O block 38. The transaction is stored with other transactions as represented by storage block 39, and the routine returns to display the welcome screen.

Figure 3:
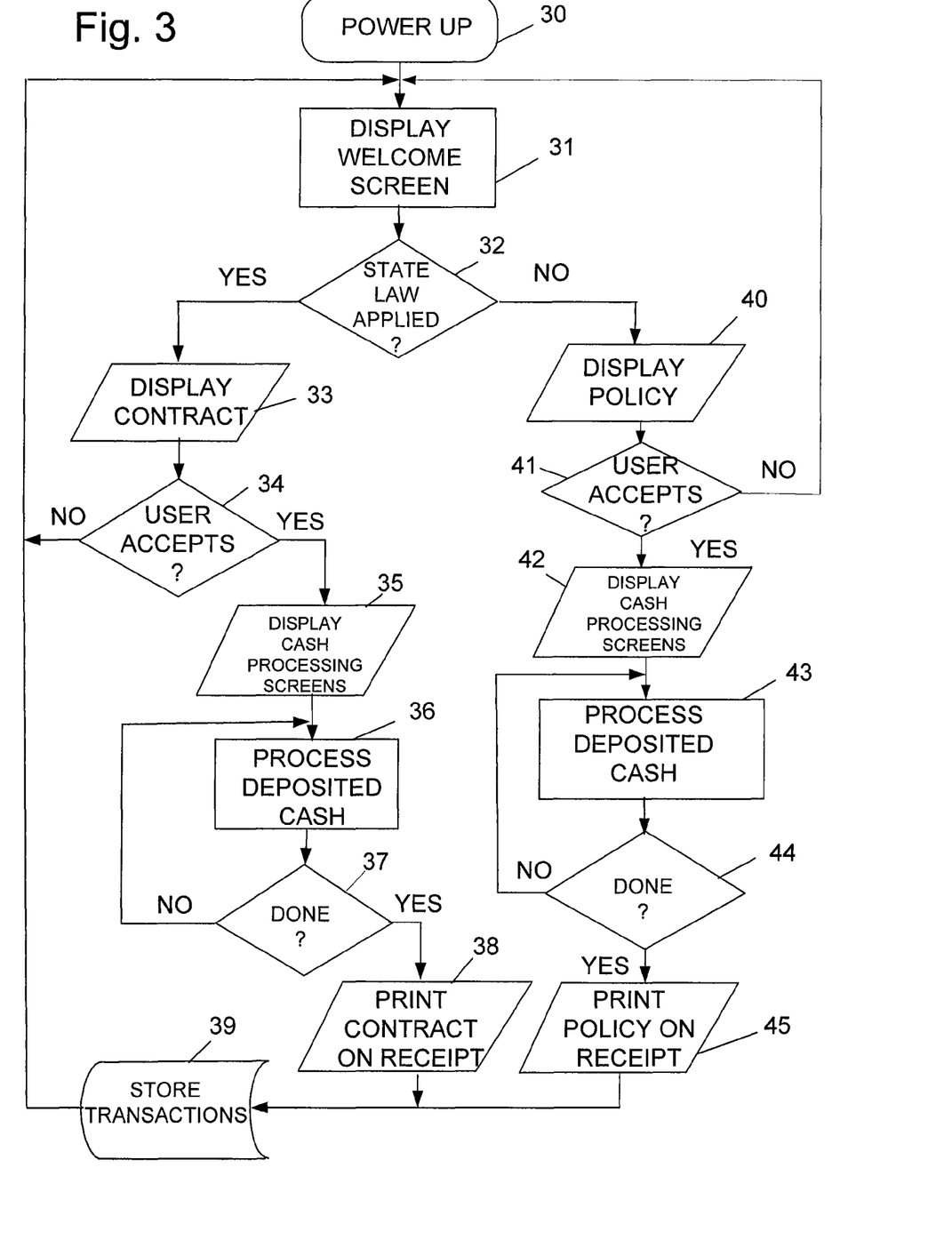
FIGS. 3 and 4 are flow charts of the method and operation of the apparatus of the present invention.

Returning to decision block 32, if the state law version is not selected as determined by a program or machine setup option, then the Acceptance Display 22 containing non-fee policy is displayed as represented by I/O block 40. Then the user has the option to accept the terms and conditions of the Acceptance Display 22, by operating the "Yes" button (the "A" button or key in FIG. 2,) as represented by decision block 34. If the user operates the "A" button, as represented by the "Yes" result from decision block 41, the routine proceeds to cause a display of a series of cash processing screens as represented by I/O block 42. If the user declines the terms and conditions, by operating the "B" button or key, or not operating either button for a timeout period, this is represented by a "No" result from decision block 41, and the routine returns to the welcome screen display. Assuming the user has accepted the terms of the Acceptance Display 22, and the cash processing screens are being displayed as represented by I/O block 42, the cash is deposited and processed as represented by process block 43. Periodically, a check is made, as represented by decision block 44 to determine is the user is done depositing cash. When this answer is "Yes," a receipt will be printed with a non-fee policy for future redemption as represented by I/O block 45. The transaction is stored with other transactions as represented by storage block 39, and the routine returns to display the welcome screen.

Figure 4:
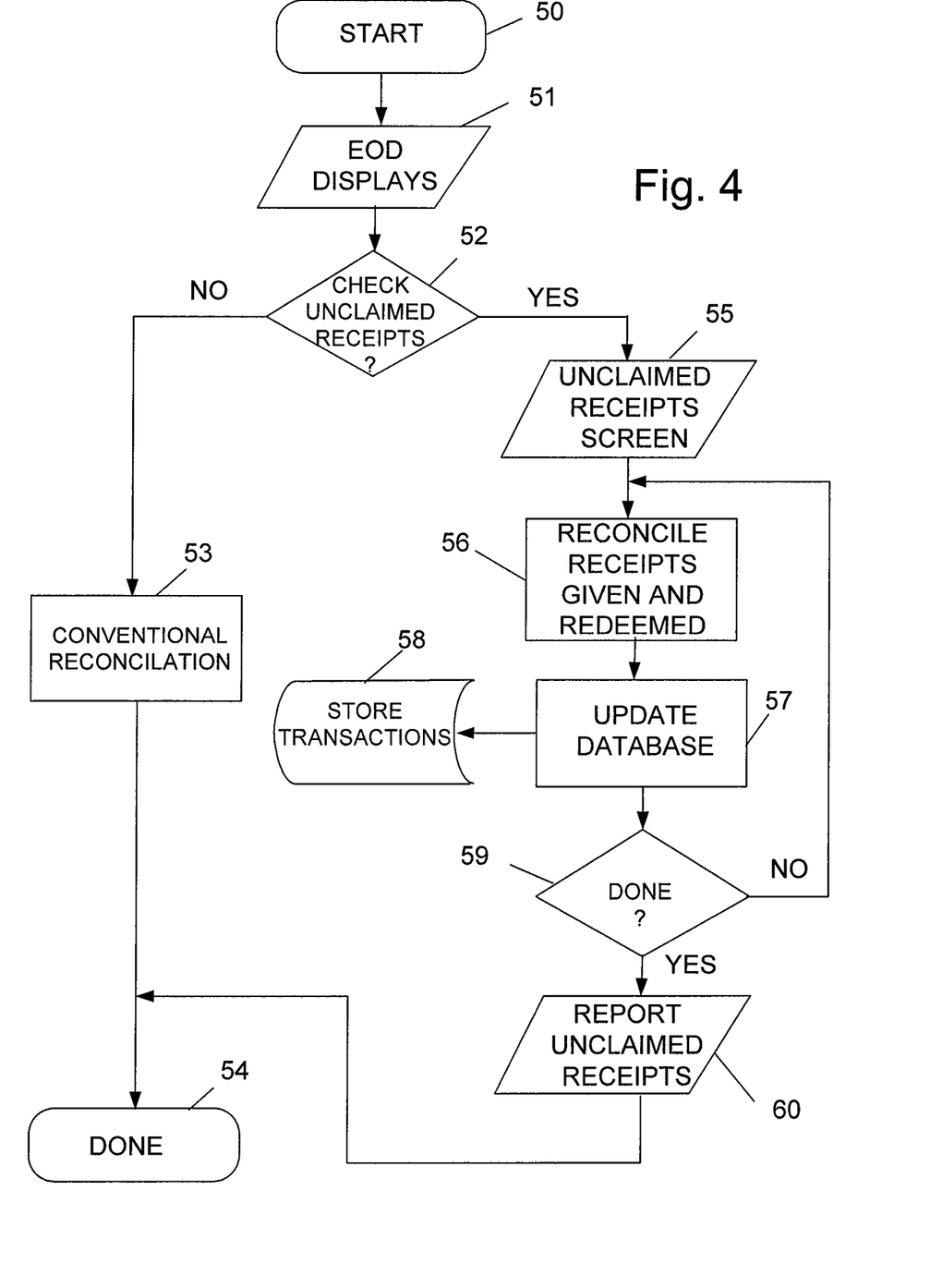

The end of the day reconciliation routine is illustrated in FIG. 4 as a programmed operation of the machine 10. This routine may be executed in an internal personal computer in the machine or with a service computer connected to the machine. After entering the reconciliation routine represented by the start, block 50, a display is shown which asks the operator if this is a normal reconciliation or if this is reconciliation with unclaimed receipts. This choice is represented by decision block 52. If the answer is "No," as represented by the "No" result from block 52, the conventional reconciliation routine is executed as represented by process block 53 and the routine ends as represented by done block 54. If it desired to include unclaimed receipts as represented by the "Yes" result from decision block 52, the operation proceeds to display an unclaimed receipts screen, represented by I/O block 55, which is displayed by the machine either on the user screen 15 in FIGS. 1 and 2, or an auxiliary computer display. This screen would display data to be described further below in relation to FIG. 5. In performing reconciliation with unclaimed receipts, receipts dispensed or given to customers are compared with receipts that have been redeemed, as represented by process block 56, and a transaction database is updated and stored as represented by process block 57 and storage block 58. The updates continue until the reconciliation is done as represented by "Yes" result from decision block 59. At this point a report of unclaimed receipts can be made by printout or by electronic communication as described below, and this is represented by I/O block 60. The reconciliation with unclaimed receipts is then complete as represented by done block 54.

Figure 5:
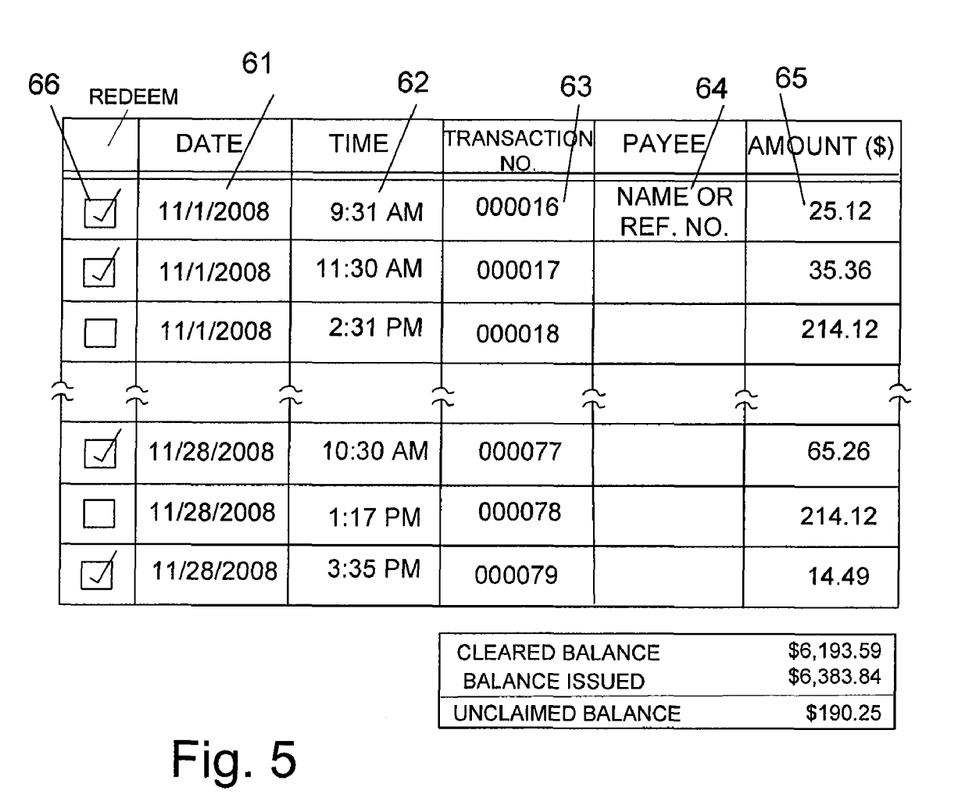
FIG. 5 is diagram of a reconciliation report that is stored in the machine for printout, display or communication to a computer for further processing.

The transaction data is stored for a period of time in a file stored on and accessible within the self-service cash redemption machine 10. During periodic balancing operations (normally daily), an operator reconciles the individual transaction receipts redeemed against this file of open transactions by keyboard entry on an internal keyboard 27 resident in the machine or through an electronic input device. The machine 10 can display or printout a data file as shown in FIG. 5, in which a date 61, time 62 and transaction number 63, payee (optional) 64 and an amount 65 is listed for each transaction. With either form of entry, the unique transaction number 63 is printed on each corresponding transaction receipt and is entered along with the total amount due to the customer, which is also printed on the receipt. In a further example of the process illustrated in FIG. 4, a stored transaction file as seen in FIG. 5 is displayed by the self-service coin machine and is sequentially processed by an operator using the two-button keypad including keys "A" and "B" seen in FIGS. 1 and 2 or by accessing the service keyboard 27 behind the façade 12 of the machine 10 as seen in FIG. 6. If the external keys are used, one key is actuated to scroll through the transactions, while the second key is used to indicate those that have been redeemed and marks checks in check boxes 66 or marks this status with other markers. With either type of input device, a comparison of the stored file of receipts dispensed with a record of redeemed receipts, using the onboard processor (a PC 26 or otherwise), shows those transaction receipts that have been redeemed (those with checks in the boxes in FIG. 5) and those that have not been redeemed (no check marks). As part of the reconciliation process, the personal computer 26 in the machine will also calculate and display a cleared balance, a total of receipts issued and an unclaimed receipts balance as seen in FIG. 5.

The data for the unredeemed receipts is conveyed by the self-service coin machine processor to one or more of the following destinations:

a) To a transaction file of unredeemed deposits resident on the self-service cash redemption machine for subsequent processing, analysis and reporting;

b) To a removable electronic storage media for removal and subsequent processing by another device;

c) To a resident printer on the self-service coin device for hard copy printout to keep records either manually or through re-entry on a different device; or d) Through a network to another computer (local or remote) for processing or integration to a resident processing application.

The proposed invention addresses multiple needs resulting from self-service coin processing machine deployment and operation. First, it responds to the need to notify customers of the fee policy for future transaction receipt redemption, and to complete the legal requirement to establish a written contract with the customer. Such a contract is necessary under some state laws if service fees are to be applied for future redemption or during the dormancy period. This allows the collection of justifiable and reasonable service fees to maintain this dormant transaction data and serves to reimburse the organization charged with the responsibility to track and report this data for their associated costs. These service fees also serve to reduce the amount that is ultimately surrendered to the governmental authorities.

Another aspect of the invention is to process unredeemed transaction receipts in such a way as they are exempt from reporting requirements under the unclaimed property laws where permissible under state law. This is accomplished by notifying the customer that transaction receipts issued by the self-service coin machine may be redeemed at any time, now or in the future, for full face value with no fees assessed for the dormancy period.

Another need addressed by the proposed invention relates to the self-service coin machine reconciliation process, which is required to identify unredeemed transaction receipts on a periodic basis. Yet another need addressed by the invention is to provide for the storage and tracking of unredeemed self-service coin machine transactions for long periods of time, which is required to comply with state escheatment laws. By minimizing the related complexities, institutions or organizations that deploy self-service coin machines are relieved of the burden of standalone processes or manual tracking means and the costs associated with compliance is minimized.

It will be apparent to those of ordinary skill in the art that other modifications might be made to these embodiments without departing from the spirit and scope of the invention.

We claim:

1. A coin exchange machine, the machine comprising:
   a coin counting mechanism that receives a plurality of coins from a customer and counts the coins to determine a total; and
   a dispensing mechanism that dispenses a receipt in exchange for the coins, wherein the receipt is redeemable for cash or other valuable consideration; and
   wherein before totaling the coins and before dispensing the receipt, the machine provides a display of a notice with a request for the customer to indicate acceptance of the notice through a user interface;
   wherein the machine receives an acceptance from the customer of the notice through the user interface; and
   wherein only after receiving an acceptance from the customer through the user interface, the machine then proceeds to total coins deposited by the customer and to dispense the receipt to the customer for redemption; and
   wherein the machine display of the notice sets forth a service fee for delay in redeeming the receipt.

2. A coin exchange machine, the machine comprising:
   a coin counting mechanism that receives a plurality of coins from a customer and counts the coins to determine a total; and
   a dispensing mechanism that dispenses a receipt in exchange for the coins, wherein the receipt is redeemable for cash or other valuable consideration; and
   wherein before totaling the coins and before dispensing the receipt, the machine provides a display of a notice with a request for the customer to indicate acceptance of the notice through a user interface;
   wherein the machine receives an acceptance from the customer of the notice through the user interface; and
   wherein only after receiving an acceptance from the customer through the user interface, the machine then proceeds to total coins deposited by the customer and to dispense the receipt to the customer for redemption; and
   wherein the machine display of the notice provides a notice to the customer that receipts issued by the coin exchange machine may be redeemed at any time, now or at a future time, for full face value with no fees assessed for a dormancy period since the receipt was issued.

3. The machine as recited in claim 1 or 2, wherein the machine further comprises a user interface with a screen and input keys; and wherein the notice is displayed on the screen prior to acceptance by the customer.

4. The machine as recited in claim 3, wherein the machine includes a printer; and wherein the receipt is printed out and dispensed after acceptance of the notice by the customer.

5. The machine as recited in claim 4, wherein a copy of the notice is printed on the receipt after acceptance by the customer and after printing, the receipt is dispensed from the machine.

6. The machine as recited in claim 4, wherein a copy of the notice is pre-printed on the receipt before transaction information is printed on a front side of the receipt and the receipt is then dispensed from the machine.

7. The machine as recited in claim 1 or 2, wherein the machine stores a record of receipts dispensed.

8. The machine as recited in claim 7, wherein the record of receipts is stored on the coin exchange machine for subsequent processing.

9. The machine as recited in claim 7, wherein the record of receipts is transmitted to a removable electronic storage media for removal and subsequent processing by another device.

10. The machine as recited in claim 7, wherein the record of receipts is transmitted to a printer on the coin exchange machine for printout to assist manual recordkeeping or re-entry on a different device.

11. The machine as recited in claim 7, wherein the record of receipts is transmitted to a network comprising another computer for further processing of the record of receipts.

12. The machine as recited in claim 7, wherein the machine displays a list of dispensed receipts for comparison with a list of redeemed receipts and allows an update of the list of dispensed receipts to indicate those receipts that have been redeemed.

13. The machine as recited in claim 12, wherein the update of the list is carried out automatically by a computer within the machine.

14. The machine of claim 1 or 2, wherein the machine is a self-service cash redemption machine that is located in at least one of a financial services office and a retail store.

\* \* \* \* \*